United States Patent [19]
Dorricott et al.

[11] Patent Number: 5,943,690
[45] Date of Patent: Aug. 24, 1999

[54] DATA STORAGE APPARATUS AND METHOD ALLOCATING SETS OF DATA

[75] Inventors: Martin Rex Dorricott, Basingstoke; Penelope Susan Cox, Hook; David Colin Charles Shepherd, Bath, all of United Kingdom

[73] Assignees: Sony Corporation, Tokyo, Japan; Sony United Kingdom Limited, Weybridge, United Kingdom

[21] Appl. No.: 08/826,656

[22] Filed: Apr. 7, 1997

[51] Int. Cl.⁶ .................................................. G06F 12/00
[52] U.S. Cl. ........................... 711/171; 711/172; 707/205
[58] Field of Search .................... 707/205; 711/113, 711/153, 206, 209, 148, 171, 172

[56] References Cited

U.S. PATENT DOCUMENTS

| | | | |
|---|---|---|---|
| 4,638,424 | 1/1987 | Beglin et al. | 711/117 |
| 5,345,584 | 9/1994 | Hill | 711/170 |
| 5,506,986 | 4/1996 | Healy | 707/204 |
| 5,675,726 | 10/1997 | Hohenstein et al. | 395/182.04 |
| 5,732,402 | 3/1998 | Lehman | 707/205 |

*Primary Examiner*—John W. Cabeca
*Assistant Examiner*—Mehdi Namazi
*Attorney, Agent, or Firm*—Frommer Lawrence & Haug, LLP.; William S. Frommer

[57] ABSTRACT

A data storage apparatus has a plurality of storage spaces p for storing sets of data. Each of the spaces has: available (unused) space $x_1$ for storage; a number $x_2$ of data sets already stored; a number $x_3$ of channels available for transferring data to the space; and a number $x_4$ of times the space is scheduled to be used for reading out sets of data therefrom. An allocation factor $Qp=f(ai, xi)$ is calculated for each space where ai are weighting factors ranking xi in order of importance. A data set is allocated to the space having the "best" (e.g. lowest) value of Qp at the time the data is to be allocated. Once allocation factors determined, then data may be allocated according to usage indices representing the ability of a space to store the data at the time of allocation.

30 Claims, 1 Drawing Sheet

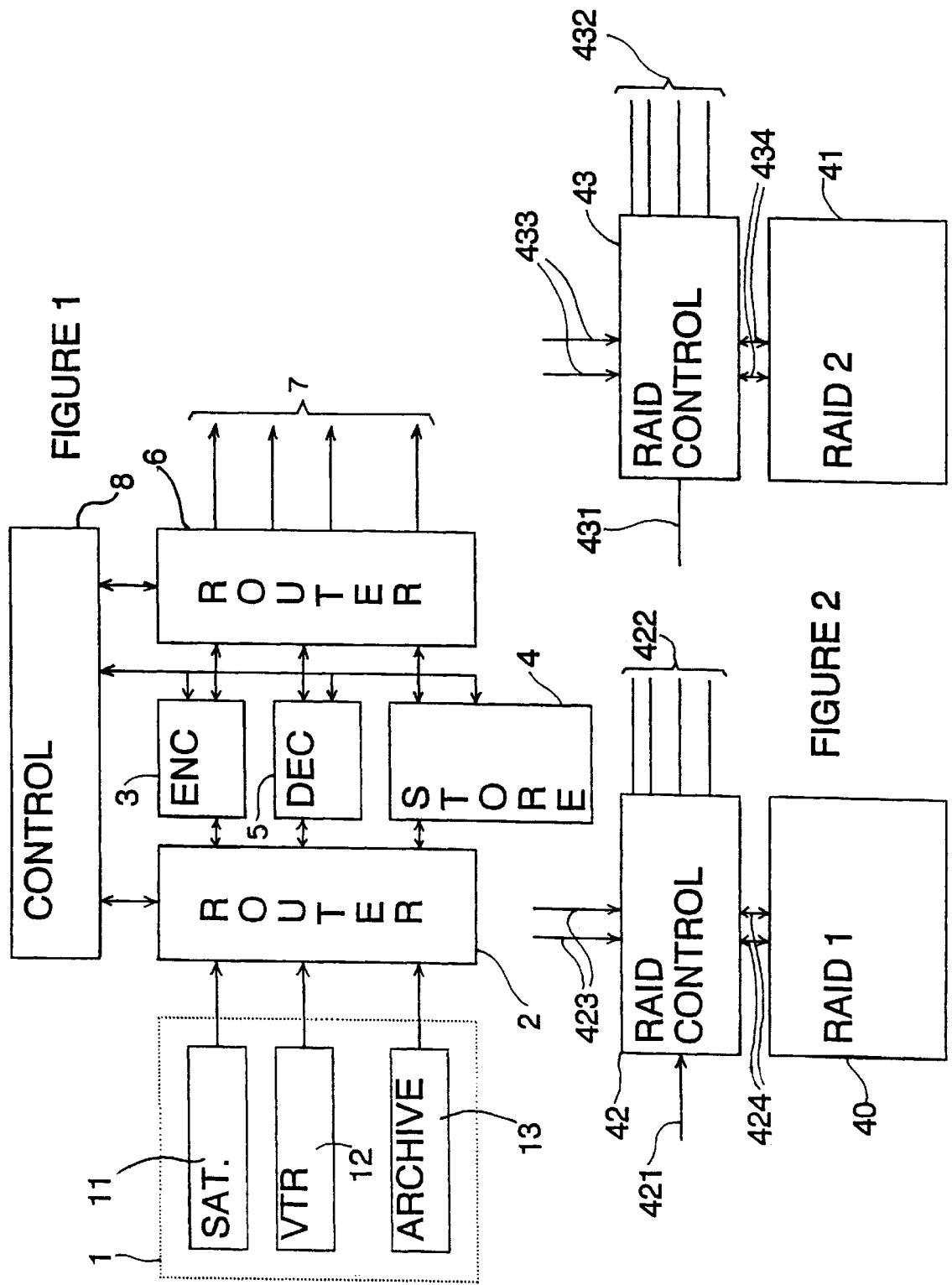

DATA STORAGE APPARATUS AND METHOD ALLOCATING SETS OF DATA

BACKGROUND OF THE INVENTION

1. Field of the Invention

The present invention relates to data storage apparatus for use in compu systems.

2. Description of the Prior Art

It is known in a computer data storage system to divide the available data storage into a plurality of physical drives, each drive providing a data storage space. A single physical drive may be partitioned to provide different spaces on the drive and/or to create "logical drives".

It is known to allocate data to the resultant spaces by giving the spaces names such as A, B, C, D, etc and allocating data to them according to names (A, B, C, D) manually chosen using e.g. a keyboard or pointing device. This is done in DOS, WINDOWS and for networks NOVELL Netware, for example. (DOS, WINDOWS and NOVELL are TradeMarks). Such allocation of data takes no account of the need to quickly access the data with substantially equal ease of access to wherever it is stored.

SUMMARY OF THE INVENTION

According to one aspect of the present invention, there is provided a data storage apparatus having a plurality p of data storage spaces for the storage of sets of data, and allocation means for allocating the sets of data to the p spaces, the allocation means determining for each space p an allocation factor Qp where $$Qp = \Sigma f(ai, xi)$$

where the xi(i=1 to n) are a predetermined set of variables which influence the ability of a space p to store a data set at the time the set is to be allocated to the space and to allow the data set to be read out, and ai are weighting factors for weighting the variables according to a predetermined ranking of the relative importance of the variables, the Qps of the spaces p being compared and the data being allocated to a space p in dependence upon the comparison.

In an embodiment of the invention, $$Qp = \Sigma ai(xi)^2 \text{ or } \Sigma ai(xi)$$

and data is allocated to the one of the spaces p having the lowest value of Qp.

xi are for example:

$x_1$ - measure of unused space in space p $x_2$ - measure of data sets stored in space p $x_3$ - measure of available channels for accessing space p $x_4$ - measure of number of times a space p is scheduled for reading data out and/or writing data in.

Thus, the invention allows data to be automatically allocated amongst spaces p, by comparing the Qp's of the spaces and selecting the best (e.g. the lowest value of Qp). Thus data is allocated efficiently to the spaces and is allocated in a way maximising the efficiency of access to it.

The variable $x_1$ will act with a tendency to evenly distribute the amount of data amongst the spaces p.

Variable $x_2$ will act with a tendency to evenly distribute the number of data sets amongst the spaces p.

Variable $x_3$ will act to allocate data according to the access bandwidth available.

Variable $x_4$ will act to allocate data according to the expected usage of a space.

The weighting factors weight the variables in a predetermined ranking. The weighting factors are chosen by the system designer so that the designer can balance the influences of the various variables xi on allocation.

The invention allows, for example, data sets to be allocated to a plurality of spaces so that all data sets can be accessed efficiently from all the spaces p.

Although four particular variables $x_1$ to $x_4$ have been discussed, other variables may affect the efficiency of accessing data storage space. The present invention allows any number of variables to be taken into account.

According to another aspect of the invention, there is provided data storage apparatus comprising a plurality p of data storage spaces for the storage of sets of data, and allocation means for allocating the sets of data to the p spaces, according to usage indices of the spaces, the indices of the usage of the spaces being indicative of the ability of the apparatus to transfer data in different modes of operation.

In a preferred embodiment of the invention the data storage apparatus accords with both of the said aspects of the invention.

The usage indices represent a numerical model of the data storage apparatus and the apparatus is controlled in accordance with that model.

The said another aspect of the invention allocates data to that one of the p spaces which at the time of allocation, has resources available to allow the transfer. Thus, it allows data to be transferred to a space p in accordance with the value Qp, only if that space p has the resources available to allow the transfer.

In one example of the invention, the data is video data. In that example the modes of use include for example, idle, (i.e. unused), record, and playback. Playback may be at various speeds, e.g. 1x, 2x, 4x normal speed. Other modes discussed hereinafter may exist.

Each space p may have a plurality of input/output channels, each of fixed bandwidth.

Idle makes no use of the space and of the bandwidth of the channels.

Playback may use one or more output channel, with 4x playback using the entire bandwidth of an output channel, slower playback using less. Record similarly uses at least one input channel.

Some modes of operation may use two or more channels. Furthermore, one or more channels may be defective.

The useage indices may be used to determine which combinations of modes of operation of a storage space can occur simultaneously. For that purpose the apparatus comprises scheduling means for storing a schedule of transfers of sets of data to/from the spaces p, the transferring means transferring data to and/or from a space p at a particular time if, the sums of corresponding useage indices associated with the transfers scheduled for that particular time are all less than respective predetermined values.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 1 is a schematic block diagram of a video signal recording and reproducing system in which illustrative data storage apparatus of the present invention is useable.

FIG. 2 is a schematic block diagram of illustrative data storage apparatus according to the invention.

DESCRIPTION OF THE PREFERRED EMBODIMENTS

FIG. 1 shows an illustrative system in which video signals from a variety of sources 1 are routed by a router 2 optionally via an encoder 3 to data storage 4 where the encoded video is stored.

Stored video is played back via a decoder (if encoded) and routed by another router 6 to one of a plurality of output channels 7.

Some of the channels 7 may be feeds to broadcast facilities. Others of the channels may be to video processing such as editing. For editing, the channels 7 may be input/output channels allowing the reading of video from storage 4 and the writing of edited video back to the store 4.

The system is controlled by a control 8 comprising one or more computers which maintain directories of the files of video data stored in storage 4. The control 8 also maintains a schedule of expected times at which video from the sources 1 are to be recorded on the data storage and of expected times at which video is to be played back (e.g. for broadcast) from the storage.

The control 8 controls the recording and playback in accordance with the schedule. The sources 1 may comprise satellite links, 11, video tapes 12 and video stored in an archive 13.

FIG. 2 shows an example of the data storage 4 of FIG. 1. In this illustrative example, data storage comprises two RAIDs 40 and 41. Each RAID has a RAID controller 42, 43 which responds to control signals from the system control 8 to control writing in (recording) of video signals onto the RAID and read-out (playback) of video signals from the RAID. Each RAID controller 42, 43 has a single input channel 421, 431 for receiving video to be recorded and a plurality (e.g 4) of output channels 422, 432 for the playback of video from the RAID. The 4 output channels allow the simultaneous playback of 4 channels of video from the RAID. Each RAID controller 42, 43 receives control signals from the system control 8 via two control channels 423, 433.

For the purpose of this example each RAID 40, 41 in its entirety is a storage space. Thus, there are p=2 such spaces. There may be more than 2 spaces: p being an integer equal to or greater than 2 in general.

In addition to maintaining directories of files, i.e. names of files and addresses of the files on the storage spaces, it is desired that the files are stored so as to be efficiently accessed. It is recognised herein that many factors influence the efficient accessing of files stored in the RAIDs 40, 41. The factors which are considered in this example are:

a) a measure $x_1$ of unused space $x_1$ available on a RAID,
b) a measure $x_2$ of the number of files stored on a RAID,
c) a measure $x_3$ of the number of input and output channels available to record and replay files,
d) a measure $x_4$ of the number of bookings for record/replay or other mode of operation scheduled for a RAID.

Other criteria could be considered, including the bandwidths of the channels, and total file size.

The system control can ascertain the unused space ($x_1$) and the number of files ($x_2$) allocated to a RAID from the directory. The number of available channels ($x_3$) in principle is a known fixed number being dependent on the hardware. In practice, faults may reduce the number of channels so $x_3$ may be variable. If the system control has appropriate monitoring systems, it can detect how many channels are available. The number of bookings ($x_4$) for record/playback from a RAID is ascertained by the system control from the directory and the schedule.

In accordance with this example of the invention, the system control calculates for each RAID a value Qp.

$$Qp = a_1x_1 + a_2x_2 + a_3x_3 + a_4x_4$$

where $x_1$ to $x_4$ are normalised parameters, not simply absolute counts of space, files, channels and bookings.

$x_1$ to $x_4$ are normalised because the corresponding absolute counts produce numbers whose magnitudes are very different. For example, the space available may be millions of bytes whereas the channels available may be less than ten.

In this example:

$$x_1 = \frac{\text{available space on RAID } p}{\text{total space available on all raids}}$$

$$x_2 = \frac{\text{number of files on RAID } p}{\text{total number of files in system}}$$

$$x_3 = \frac{\text{number of channels of RAID } p}{\text{maximum number of channels per RAID}}$$

$$x_4 = \frac{\text{number of bookings of RAID } p}{\text{total number of current bookings for all RAIDS}}$$

Thus $x_1$ to $x_4$ are all less than or equal to one. They are also positive numbers.

Available space=total space on RAID—bad sectors—used space. $a_1$ to $a_4$ are chosen to rank the measures $x_1$ to $x_4$. Thus, if $x_1$ is chosen to be the most important criterion, $a_1$ is made larger than $a_2$ to $a_4$.

The system control compares the Qps of the spaces and a file is allocated by the system control to the RAID having the lowest value of Qp.

Alternative functions for Qp include:

$$Qp = \Sigma a_i(x_i)^2$$

$Qp = \Sigma a_i|x_i|$ where $|x_i|$ is the absolute value of xi i=1 to n and is an integer which would be used if any parameter xi could have a negative value.

In another example $$Qp = ax_1' + bx_2' + cx_3'$$

where $$x_1' = \frac{\text{unused space on a RAID}}{\text{total space}}$$

$$x_2' = \frac{\text{total number of files on a RAID}}{\text{total number of files in system}}$$

$$x_3' = \frac{\text{current total bookings on a RAID}}{\text{total bookings on all RAIDs}}$$

and a to c are weighting factors corresponding to $a_i$.

In addition to, or as an alternative to, allocating a file to a RAID in accordance to Qp as discussed above, files may be allocated according to usage indices. A RAID, even if it has the lowest Qp, may be unable to accept a file at a particular time because it is being used. Consider RAID 40 and its controller 42. The controller has one input channel 421 of fixed bandwidth, four output channels 422 also of fixed bandwidth and two data transfer channels 424 between the RAID 40 and controller 422 and two control channels 423, e.g. RS422 channels. The RAID has plural modes of operation, such as record at various speeds, playback at various speeds, edit when used with a video editor, erase and idle.

The following Table 1 sets out a set of usage indices which represent a numerical model of the RAID 40 and its controller 42.

TABLE 1

RAID Usage

| Mode | Session (Device B/W) | Control | Input | Output |
|---|---|---|---|---|
| Idle | 0 | 0 | 0 | 0 |
| Control | $Y_1$ | $Y_2$ | $Y_3$ | $Y_4$ |
| Play x1 | 25 | 0 | 0 | 25 |
| Play x2 | 50 | 0 | 0 | 25 |
| Play x4 | 100 | 0 | 0 | 25 |
| Record | 25 | 0 | 100 | 0 |
| Record x2 | 50 | 0 | 100 | 0 |
| Record x4 | 100 | 0 | 100 | 0 |
| Erase | 0 | 0 | 0 | 0 |

The numbers in the table represent percentages of the various RAID resources which may be used in each mode. The resources are:

Input—representing the input channel

Output—representing the output channels

Control—representing the bandwidth of the control channels to the controller.

Session—representing the bandwidth of the data transfer channels linking the controller and the RAID.

By way of explanation, idle and erase use none of the resources so all values of resource are zero. Play x1 uses one output channel of 4, i.e. 25% of the output channels. It also uses 25% of the bandwidth of the data transfer channels 424 of the RAID. Play x2 and Play x4 also use only one output channel but 50% and 100% respectively of the bandwidth of the data transfer channels 424. Record x1, x2, x4, uses the 1 input channel: i.e. 100% of the input resource, and 25, 50 and 100% respectively of the bandwidth of the data transfer and channels.

Control as a mode is, for example editing of video where the control channels 423 are used to control the operation of the controller 42 and RAID 40. An edit operation at normal speed where data is output uses one of four outputs $Y_{4=}25\%$, $Y_{1=}25\%$ of the data transfer bandwidth and $Y_{2=}50\%$ of the bandwidth of the control channels for controlling the RAID. Because data is output only $Y_{3=}0$.

The numbers given in Table 1 are examples only and would change depending on the hardware and the bandwidths of the signals to be recorded/played back, and the control functions being implemented.

Providing the usage index is less than 100% for all categories, then the RAID has spare capacity for other functions. Thus, play x1 has an index (25, 0, 0, 25) and so in principle a file can be recorded at the same time as play x1 occurs.

As discussed above bookings for record/playback are recorded in a schedule by the system control. When a new booking for a particular mode of operation is to be made, reference is made to the schedule for other bookings occurring at the same time as the new booking. The useage indices for the bookings of a space p are derived from the Table 1 and added together. If the value of the sum of the bookings including the new booking for the space p are less than (100, 100, 100, 100) for (Session, Control, Input, Output) respectively then the new booking may be allocated to the space p.

As discussed so far, the numbers given in the Table 1 are assured to be percentages of the actual resource available as defined by the hardware for real signals. The numbers of the Table may be adjusted so as to defme predetermined modes of operation which are allowed to occur and disallow others. For instance, Play x1 and Play x2 together are allowed by Table 1. If the session and/or output numbers are increased so that they sum to greater than 100, Play x1 and Play x2 together would be disallowed.

The invention is not limited to the foregoing examples.

There may be more than p=2 RAIDS, each defining a storage space.

Each RAID may be partitioned or otherwise divided into 2 or more logical drives, or volumes. Thus, one RAID may define more than one storage space.

The storage spaces may be provided by storage devices other than RAIDS, having magnetic discs, such as magneto-optical (MO) disc drives.

The data stored may be other than video data.

Where both Qp and usage indices are needed, Qp may be determined before or after the usage indices are determined to allocate a file to a storage space.

The allocation of data using Qp spreads the data across the spaces p. The usage indices indicate whether a space p is capable of storing the data at the time of allocation.

It is desirable to use the spaces p efficiently to maximise the data storage capacity. Thus in a preferred embodiments the allocation means, in addition to allocating data sets to the spaces p in accordance with the said factors Qp, allocates the data sets in accordance with at least one other criterion.

As an example of such another criterion, where residual space is available in one of the spaces p which can be filled by a filed, that residual space is used instead of allocating according to Qp. In this way, the unused space on a nearly full space is minimised and available space maximised in the other space(s) p.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defmed by the appended claims.

We claim:

1. A data storage apparatus comprising:

a plurality of data storage spaces p for storing sets of data; and allocation means for allocating the sets of data to the data storage spaces p, the allocation means determining for each data storage space p an allocation factor $Qp=\Sigma f(ai,xi)$;

where the xi(i=1 to n) are a predetermined set of variables which influence the ability of a data storage space p to store a data set at the time the set is to be allocated to the space and to allow the data set to be read out, and ai are weighting factors for weighting the variables according to a predetermined ranking of the relative importance of the variables, the allocation factor Qp of the data storage spaces being compared with each other and the data being allocated to a data storage space p in dependence upon the comparison.

2. Apparatus according to claim 1, wherein $$Qp=\Sigma ai(xi)^2$$

and data is allocated to the data storage spaces p having the lowest value of Qp.

3. Apparatus according to claim 1, wherein $$Qp=\Sigma a_i|x_i| \text{ and}$$

data is allocated to the data storage space p having the lowest value of Qp.

4. Apparatus according to claim 1, wherein one of the variables, $x_1$, is a measure of the amount of available space in a data storage space p.

5. Apparatus according to claim 1 wherein one of the variables, $x_2$, is a measure of the number of data sets stored in a data storage space p.

6. Apparatus according to claim 1 where each data storage space p has a plurality of data transfer channels and one of the variables, $x_3$, is a measure of the number of active channels available at the time data is to be allocated to that space.

7. Apparatus according to claim 1 wherein one of the variables, $x_4$ is a measure of the number of times a data storage space p is scheduled for transfer of sets of data.

8. Apparatus according to claim 1 wherein the variables xi are normalized.

9. Apparatus according to claim 8 wherein the variables xi are normalized to a maximum value of one.

10. Apparatus according to claim 4, wherein $x_1$ is the amount of available space in a data storage space p in relation to the total space available on all data storage p spaces.

11. Apparatus according to claim 5 wherein $x_2$ is the number of files in a data storage space p in relation to the total number of files in all the data storage spaces p.

12. Apparatus according to claim 6, wherein $x_3$ is the number of data transfer channels of a data storage space p in relation to the total number of data transfer channels of all data storage spaces p.

13. Apparatus according to claim 7 wherein $x_4$ is the number of scheduled transfers to/from a data storage space p in relation to the total number of scheduled transfers to/from all data storage spaces p.

14. Apparatus according to claim 1, wherein the allocation means, in addition to allocating data sets to the data storage spaces p in accordance with said allocation factors Qp, allocates the data sets in accordance with at least one other criterion.

15. Apparatus according to claim 14, wherein the allocation means compares the size of a data set to be allocated to the sizes of the available data storage space p, and in preference to allocating the data set in accordance with Qp, allocates the data set to one of the data storage spaces p if the data set substantially fills the available space on that one of the data storage spaces p.

16. A method of allocating sets of data amongst data storage spaces p, the method comprising the steps of:

providing said p data storage spaces; and determining for each data storage space p an allocation factor Qp where $Qp=\Sigma f(a_i,x_i)$ where the xi(i=1 to n) are a predetermined set of variables which influence the ability of a space p to store a data set at the time the set is to be allocated to the space and to allow the data set to be read out, and ai are weighting factors for weighting the variables according to a predetermined ranking of the relative importance of the variables, the allocation factor Qp of the data storage spaces being compared with each other and the data being allocated to a data storage space p in dependence upon the comparison.

17. The method according to claim 16, wherein the step of determining determines said allocation factor $Qp=\Sigma a_i (x_i)^2$ such that the sets of data are allocated to the data storage spaces p having the lowest value of Qp.

18. The method according to claim 16, wherein said step of determining determines said allocation factor $Qp=\Sigma a_i|x_i|$ such that the sets of data are allocated to the data storage spaces having the lowest value of Qp.

19. The method according to claim 16, wherein the step of determining determines said allocation factor Qp in accordance with the variable $x_1$ indicative of the measure of the amount of available space in a data storage space p.

20. The method according to claim 16, wherein said step of determining determines said allocation factor Qp according to the variable $x_2$ indicative of a measure of the number of data sets stored in a data storage space p.

21. The method according to claim 16, wherein the step of determining determines the allocation factor Qp according to the variable $x_3$ indicative of a measure of the number of active channels available at the time the data is to be allocated to that space.

22. The method according to claim 16, wherein the step of determining determines the allocation factor Qp according to the variable $x_4$ indicative of a measure of the number of times a data storage space p is scheduled for transferring sets of data.

23. The method according to claim 16, further comprising the step of normalizing said variables xi.

24. The method according to claim 23, wherein the step of normalizing normalizes said variables xi to a maximum value of 1.

25. The method according to claim 19, wherein $x_1$ is the amount of available space in a data storage space p in relation to the total space available on all data storage spaces p.

26. The method according to claim 20, wherein $x_2$ is the number of files in a data storage space p in relation to the number of files in all the data storage spaces p.

27. The method according to claim 21, wherein $X_3$ is the number of data transfer channels of a data storage space p in relation to the total number of data transfer channels of all data storage spaces p.

28. The method according to claim 22, wherein $x_4$ is the number of scheduled transfers to/from a data storage space p in relation to the total number of scheduled transfers to/from all data storage spaces p.

29. The method according to claim 16, wherein said step of determining, in addition to allocating data sets to the data storage spaces p in accordance with said allocation factor Qp, allocates the data sets in accordance with at least one other criterion.

30. The method according to claim 29, wherein the step of determining compares the size of a data set to be allocated to the sizes of the available data storage space p, and in preference to allocating the data set in accordance with Qp, allocates the data set to one of the data storage spaces p if the data set substantially fills the available space on that one of the data storage spaces p.

* * * * *